R. W. PITTMAN.
SHUTTER FOR MOTION PICTURE APPARATUS.
APPLICATION FILED SEPT. 3, 1920.
1,398,242.
Patented Nov. 29, 1921.
3 SHEETS—SHEET 2.
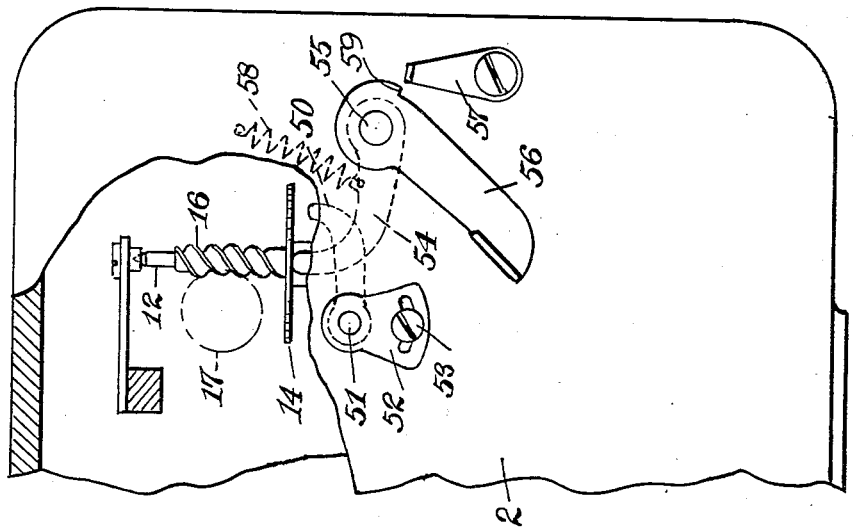
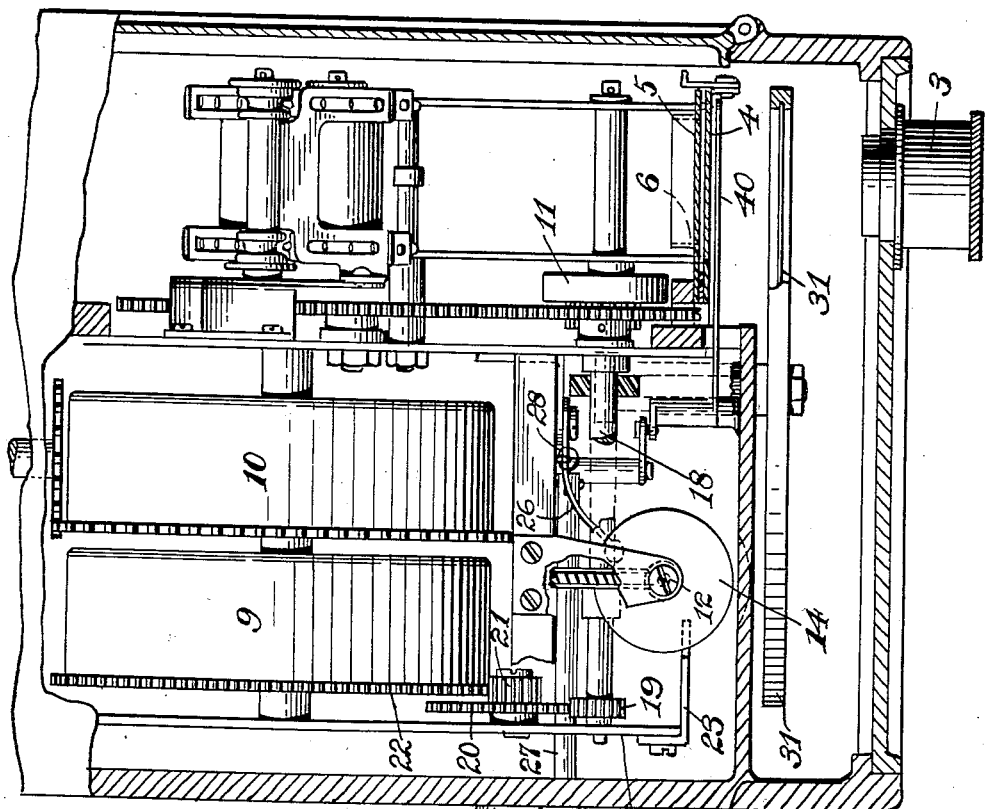
Inventor
R. W. Pittman
By his Attorney
Wm. H. Reid.

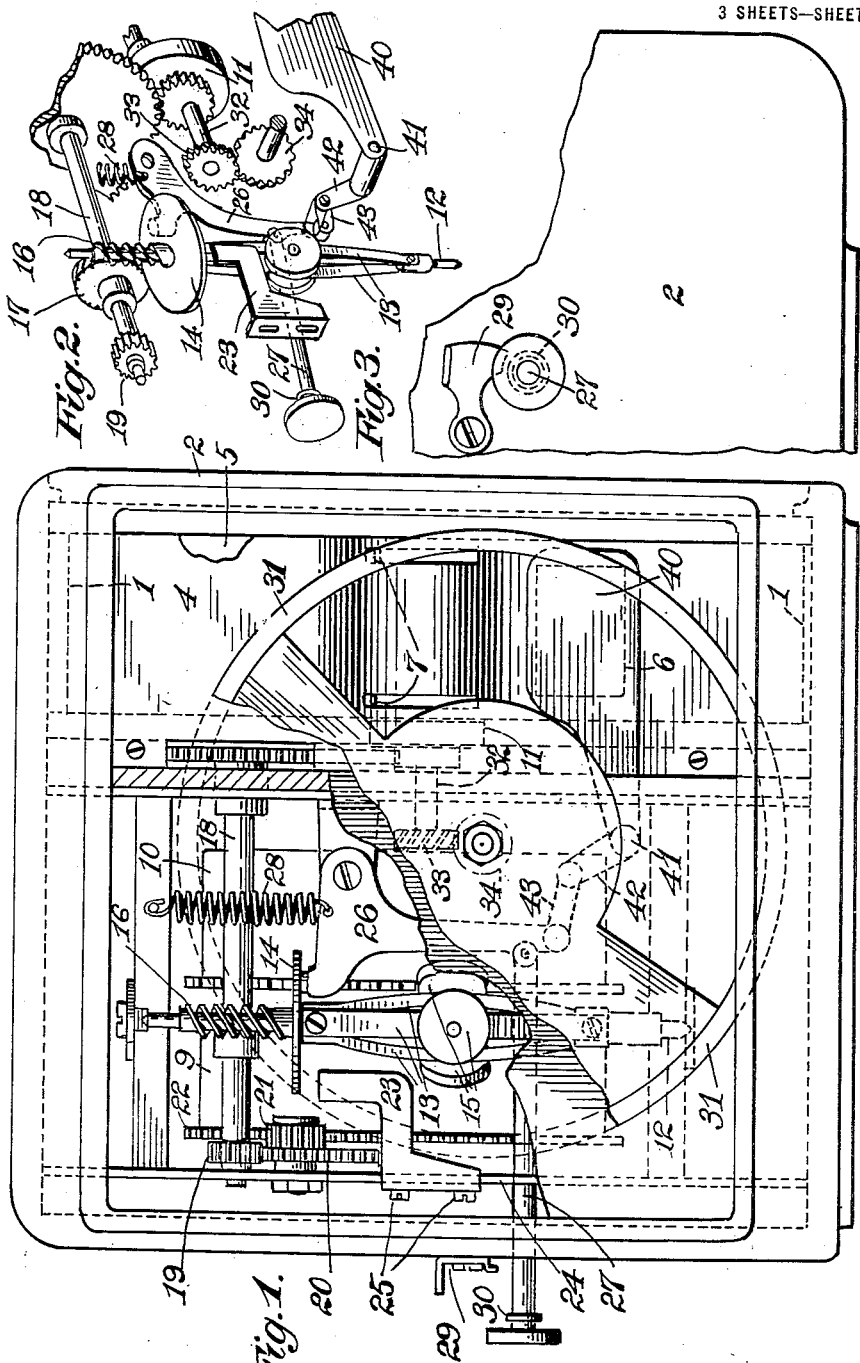

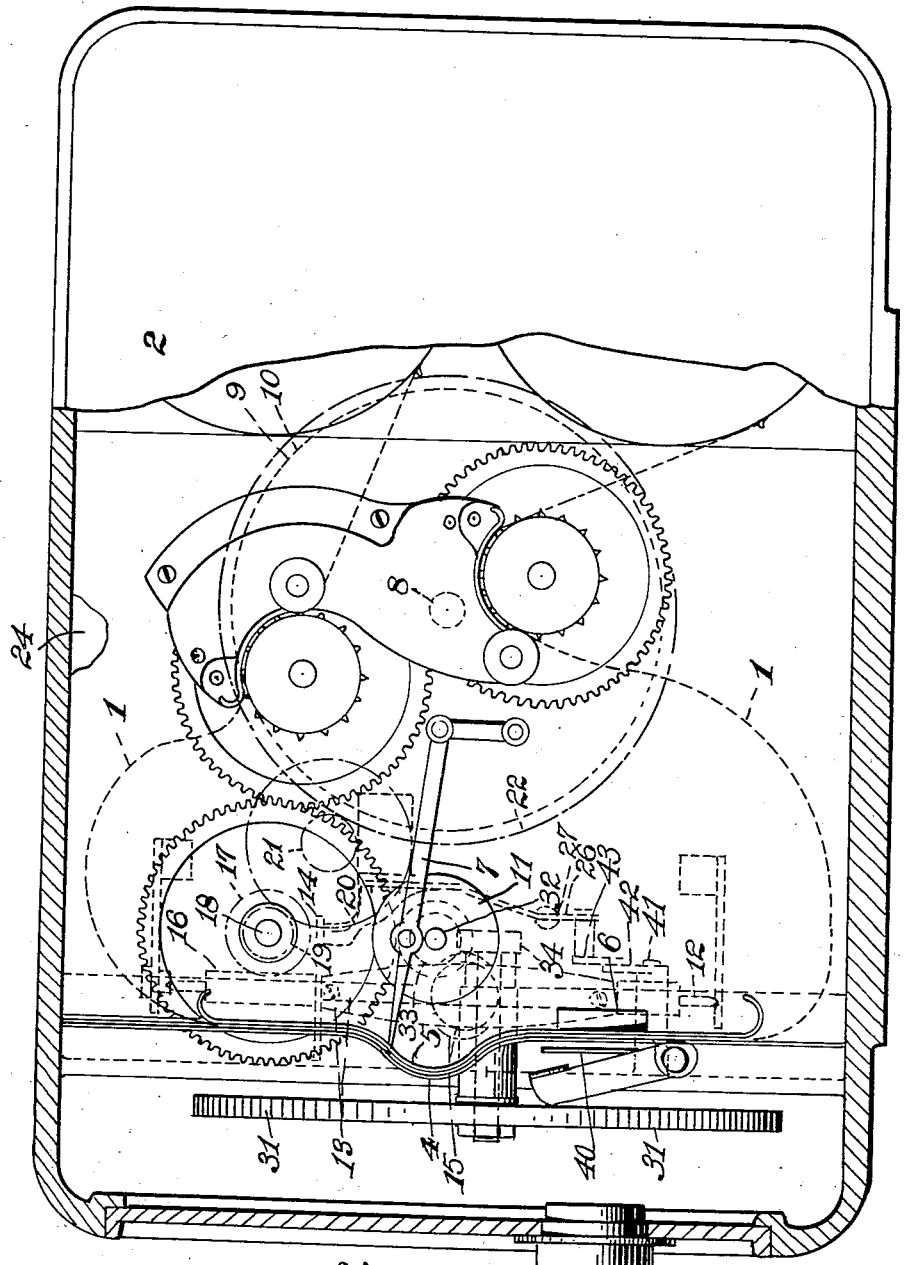

UNITED STATES PATENT OFFICE.

REINHART W. PITTMAN, OF NEW YORK, N. Y.

SHUTTER FOR MOTION-PICTURE APPARATUS.

1,398,242.                    Specification of Letters Patent.    Patented Nov. 29, 1921.

Application filed September 3, 1920. Serial No. 407,891.

*To all whom it may concern:*

Be it known that I, REINHART W. PITTMAN, a citizen of the United States of America, and a resident of New York city, in the county of New York and State of New York, have invented certain new and useful Improvements in Shutters for Motion-Picture Apparatus, of which the following is a full, clear, and exact description.

This invention has reference to motion picture cameras, especially the kind that employ a spring motor for rotating the film drive.

One object of the present invention is to provide an improved means for the control, that will release the means that arrests the film feed, and also serve to permit such means to arrest the feed.

A further object is to provide in a camera of this character, in connection with the usual shutter that serves to expose the film each time it is arrested, a supplemental shutter that is normally located across the exposure axis and conceals the film from light rays, and which shutter is actuated by the control means that will release the feed mechanism, to move out of the exposure axis; and which shutter is returned to its normal concealing position when the control is permitted to stop the film feed.

In the accompanying drawings showing one embodiment of my invention, Figure 1 is an end view of the camera with the end plate removed.

Fig. 2 shows the governor and connected mechanism.

Fig. 3 shows stop for the control bar.

Fig. 4 is a plan view with the top removed.

Fig. 5 shows another detail.

Fig. 6 is a side elevation with the side plate removed.

This invention is adapted to the form of motion picture camera in which a spring motor is employed that is wound up and placed under tension, and when the motor is released it will actuate the feeding means for the film that will bring the film to rest across the lens axis intermittently, and at the proper high speed. Such mechanism also includes a speed governor, preferably of the centrifugal type, that will prevent the film being fed beyond a certain speed. In connection therewith I provide means for engaging this governor to arrest it and stop the motor whenever it is desired, which member is actuated to release the governor and permit feeding of the film at will.

As shown in the drawings, I provide a casing denoted generally by 2, at one end of which is mounted a lens 3, see Fig. 6. The film 1 is caused to pass through a passage between guide plates 4 and 5 and across an exposure opening at 6 therein. Any suitable means may be used to feed the film, a claw feed member 7 being shown, that is actuated by suitable gears from a main shaft 8 of the motor. A spring motor is indicated at 9 and 10 on this shaft, that when put under tension will rotate the claw actuating disk 11 and thereby cause the film to be fed between the guide plates intermittently to bring the pictures thereon across the lens axis or to bring successive portions of the film in the lens axis for exposure, when the camera is used to take pictures.

To control the speed of the film feed by the spring motor, I provide a governor, comprising a vertical shaft 12 mounted in suitable bearings to rotate, and provided with a series of weighted spring plates 13, 13 whose lower ends are secured to the shaft. The upper ends of the springs are secured to a disk 14 that can slide on the shaft, and which will move downwardly when the weights 15 on the springs move outward on rotation of the shaft, in the well known manner. This governor shaft is connected with the motor shaft 8 by a worm 16 on the governor engaging a worm-wheel 17 on a cross shaft 18; and this shaft connects with the motor shaft 8 by gears 19, 20, 21 and 22.

The rotation of the governor shaft will cause movement of the disk 14 downward as the speed increases, and when the proper feed is obtained for the film, this advance of the disk is arrested by a stationary stop 23 that will engage the lower face of the disk. This stop may be adjustably secured on a plate 24 by screws 25, whereby the speed of the film feed can be regulated as desired.

I further provide means for arresting the motor, that is caused to coöperate with the governor disk 14. As shown, I arrange a lever 26, to which is pivoted a control rod 27, projecting through the side wall as shown. This lever 26 is normally swung by a coil spring 28 to engage the lower face of the disk 14, and will prevent rotation of the governor shaft, and thereby arrest the motor and film feed. When this rod 27 is pushed inwardly by the operator, the lever 26 will be swung against the tension of the spring 28, and release the disk 14. The motor being now free, will speed up the film feed until the disk 14 engages the stop 23 that will maintain a constant proper speed for the feed. But as soon as the operator releases the rod 27, the spring 28 will cause the lever 26 to again engage the governor disk and at once arrest the motor.

If it is desired to have the rod 27 remain in the inner position to leave the motor free to run, a catch plate 29 on the end wall is moved down to engage a collar 30 on this rod that will prevent its moving outward, until released from this catch.

In Fig. 1 is shown the usual shutter 31 that will expose the film each time it is arrested, and will cover the exposure opening when the film is shifted. This shutter is suitably rotated from the shaft 32 of disk 11 by spiral gears 33, 34.

In addition to this usual shutter, I provide a supplemental shutter 40, that is normally located across the exposure opening. It will be understood that when the motor is arrested, the shutter 31 might stop with its open portion exposing the film which is objectionable where the device is used to make exposures. Therefore I provide this supplemental shutter, that is so arranged that whenever the motor is arrested, it will cover the exposure opening and close the film to light rays. This shutter I connect to be directly actuated by the control rod 27. As shown the shutter 40 is hinged at 41, and has an arm 42 that connects with the said lever 26 by a link 43, see Fig. 1. When the rod 27 is pushed inward the shutter will rock downward and expose the film, controlled by the main shutter 31. But as soon as the rod 27 is released, the lever 26 being rocked by the coil spring 28 will at once move the shutter 40 across the exposure opening.

In Fig. 5, I show the disk 14 as directly controlled by a two-arm lever, one arm of which projects through the camera wall for operation, and the other arm directly engages the disk 14. In Fig. 5 I show a modification of the controlling means. On a short shaft 55 mounted in the side wall of the casing 2 is an arm 54 that is pressed against the disk 14 by a spring 58. Outside of the casing an arm 56 is secured to the shaft 55, whereby this shaft is rocked to release the disk 14 and permit the spring motor to operate the film feed; and when released the spring 58 will retract the arm 54 and arrest the feed. A stop 57 is arranged to engage a notch 59 on the arm 56 to hold it to free the disk 14 when it is desired to allow the motor to run without holding the arm 56.

In this view I also show an adjustable stop 50 for the disk 14 as controlled by the governor. This stop 50 is attached to a plate 52 on a short spindle 51 projecting through the case 2. A screw 53 passes through a slot in the plate 52, whereby the arm 50 can be secured in adjusted positions.

In the use of this mechanism, the spring motor is put under proper tension, and the lever 26 will prevent its operation. After insertion of the film, when it is desired to expose the film, the control rod 27 is depressed, and the lever 26 will release the disk 14 of the governor, and the film feed will be at once actuated, and at the proper controlled speed. This depression of the control rod 27 will shift the shutter 40 and permit the main shutter 31 to expose the film intermittently in the usual manner. As soon as the rod 27 is released the shutter 40 will again close the aperture, and the lever 26 will engage the governor disk 14 to bring the motor to a quick stop.

This application is a continuation in part of an application originally filed by myself December 12, 1913, Serial No. 806,137; which application was renewed July 10, 1920, Serial No. 395,378.

What I claim is:—

1. In a camera, the combination of film feeding means to intermittently advance the film, a motor arranged to actuate the feeding means, a speed governor for the motor including a disk and a stationary arm, a control lever arranged to stop the feed mechanism and motor by engagement with said brake disk, and a shutter normally across the film exposure axis, but which is shifted beyond the exposure axis on operation of said lever to release the motor.

2. In a camera, the combination of film feeding means to intermittently advance the film, a motor arranged to actuate the feeding means, a speed governor for the motor including a brake disk and a stationary arm, a control lever arranged to stop the feed mechanism and motor by engagement with said brake disk, a shutter operated by the motor to expose the film when arrested, and a second shutter normally across the film exposure axis, but arranged to be shifted out of the exposure axis on operation of said lever to release the motor.

3. In a camera, the combination of film feeding means to intermittently advance the film, a motor arranged to actuate the feeding means, a speed governor for the motor including a brake disk and a stationary arm, a control lever arranged to stop the feed mechanism and motor by engagement with said brake disk, a shutter operated by the motor to expose the film when arrested, a second shutter normally across the film exposure axis, but arranged to be shifted out of the exposure axis on operation of said lever to release the motor, and means to lock the lever in position to release the motor.

4. In combination, a spring motor, film feeding means operated by the motor, a speed governor for the motor including a brake disk and a normally stationary brake arm to limit the speed of the governor and motor, and a separate control lever, a push rod on said lever projecting out of the device for movement by the operator, and a spring connected with said lever to normally retain it engaging the disk to stop the motor, whereby shifting of the lever by the push rod will release the disk and motor.

5. In combination, a spring motor, film feeding means operated by the motor, a speed governor for the motor including a brake disk and a normally stationary brake arm to limit the speed of the governor and motor, and a separate control lever, a push rod on said lever projecting out of the device for movement by the operator, and a spring connected with said lever to normally retain it engaging the disk to stop the motor, whereby shifting of the lever by the push rod will release the disk and motor, and means to lock the control lever in position to free the motor.

Signed at New York city August 31, 1920.

REINHART W. PITTMAN.